United States Patent
Tsukano et al.

(10) Patent No.: US 9,941,834 B2
(45) Date of Patent: Apr. 10, 2018

(54) POWER CONVERSION APPARATUS AND AIR-CONDITIONING APPARATUS INCLUDING THE POWER CONVERSION APPARATUS

(71) Applicant: Mitsubishi Electric Corporation, Tokyo (JP)

(72) Inventors: Keiwa Tsukano, Tokyo (JP); Akihiko Iwata, Tokyo (JP); Shinsaku Kusube, Tokyo (JP); Kenta Yuasa, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/316,561

(22) PCT Filed: Jul. 3, 2014

(86) PCT No.: PCT/JP2014/067831
§ 371 (c)(1),
(2) Date: Dec. 6, 2016

(87) PCT Pub. No.: WO2016/002053
PCT Pub. Date: Jan. 7, 2016

(65) Prior Publication Data
US 2017/0170770 A1    Jun. 15, 2017

(51) Int. Cl.
*H02P 27/14*    (2006.01)
*H02M 5/458*    (2006.01)
(Continued)

(52) U.S. Cl.
CPC .............. *H02P 27/14* (2013.01); *F25B 31/02* (2013.01); *F25B 49/025* (2013.01); *H02M 1/14* (2013.01);
(Continued)

(58) Field of Classification Search
CPC ...... H02P 27/14; H02P 27/06; H02M 5/4585; H02M 1/14; F25B 2600/021; F25B 2600/025
See application file for complete search history.

(56) References Cited

U.S. PATENT DOCUMENTS

| | | | |
|---|---|---|---|
| 6,181,583 B1* | 1/2001 | Okui ................... | H02M 1/4208 363/45 |
| 2010/0289423 A1* | 11/2010 | Yao .................... | H05B 41/2825 315/246 |
| 2011/0089915 A1* | 4/2011 | Qiu ....................... | H02M 3/156 323/271 |

FOREIGN PATENT DOCUMENTS

| JP | 08-033392 A | 2/1996 |
|---|---|---|
| JP | 2009-268303 A | 11/2009 |

(Continued)

OTHER PUBLICATIONS

International Search Report of the International Searching Authority dated Sep. 22, 2014 for the corresponding International application No. PCT/JP2014/067831 (and English translation).

*Primary Examiner* — Shawki S Ismail
*Assistant Examiner* — Muhammad S Islam
(74) *Attorney, Agent, or Firm* — Posz Law Group, PLC (57) ABSTRACT

A power conversion apparatus, including: an MLC circuit configured to boost an input voltage from a three-phase rectifier; a smoothing capacitor configured to smooth an output of the MLC circuit; an inverter control unit configured to generate a PWM signal; an inverter circuit configured to convert a DC voltage of the smoothing capacitor into an AC voltage based on an input of the PWM signal and to supply the AC voltage to a motor; a boost mode switching unit having at least three boost modes in which a boost level of the input voltage is selected and configured to switch among the at least three boost modes depending on an
(Continued)

operation status of the motor determined for the purpose of controlling a refrigeration cycle; and an MLC control unit configured to control the MLC circuit based on the switching by the boost mode switching unit.

17 Claims, 2 Drawing Sheets

(51) Int. Cl.
  *H02M 1/14* (2006.01)
  *F25B 31/02* (2006.01)
  *F25B 49/02* (2006.01)

(52) U.S. Cl.
  CPC ..... *H02M 5/4585* (2013.01); *F25B 2600/021* (2013.01); *F25B 2600/025* (2013.01)

(56) References Cited

FOREIGN PATENT DOCUMENTS

| | | |
|---|---|---|
| JP | 2012-196142 A | 10/2012 |
| JP | 2013-081343 A | 5/2013 |
| JP | 2014-050285 A | 3/2014 |
| WO | 2013/069326 A1 | 5/2013 |

\* cited by examiner

| BOOST MODE | ORDER OF SWITCHING MODE (REPEATED) |
|---|---|
| 0 (NO BOOST) | NONE |
| 1 (SLIGHT BOOST) | Mode1→Mode3→Mode2→Mode3 |
| 2 (DOUBLE BOOST) | Mode1→Mode2 |
| 3 (ABOVE DOUBLE BOOST) | Mode1→Mode4→Mode2→Mode4 |

FIG. 3

| SWITCHING MODE | Tr1 | Tr2 | D1 | D2 |
|---|---|---|---|---|
| Mode1 | OFF | ON | OFF | ON |
| Mode2 | ON | OFF | ON | OFF |
| Mode3 | OFF | OFF | ON | ON |
| Mode4 | ON | ON | OFF | OFF |

POWER CONVERSION APPARATUS AND AIR-CONDITIONING APPARATUS INCLUDING THE POWER CONVERSION APPARATUS

CROSS REFERENCE TO RELATED APPLICATION

This application is a U.S. national stage application of PCT/JP2014/067831 filed on Jul. 3, 2014, the contents of which are incorporated herein by reference.

TECHNICAL FIELD

The present invention relates to a power conversion apparatus configured to convert commercial power supply into electric power to be supplied to a motor of a compressor, and an air-conditioning apparatus including the power conversion apparatus.

BACKGROUND

Hitherto, as a large capacity inverter circuit configured to drive a motor of a compressor of an air-conditioning apparatus, a circuit employing a method in which a three-phase full-wave rectifier circuit generates a DC voltage for driving the inverter is used. In this air-conditioning apparatus, for the purpose of enhancing energy consumption efficiency during a rated cooling/heating operation (coefficient of performance (COP)) or year-round energy consumption efficiency (annual performance factor (APF)), there has hitherto been a tendency that the motor for the compressor is designed so that an induced voltage (counter electromotive force) at about a rotation speed used in rated operation of the air-conditioning apparatus is similar to the commercial power supply. In this case, when it is attempted to operate the inverter circuit in a high rotation speed region exceeding the rotation speed (for example, in overload operation), the inverter circuit cannot output a voltage that is substantially equal to or higher than the commercial power supply, and thus, a current passing through the motor of the compressor increases due to output voltage saturation, which lowers motor efficiency and increases loss in the inverter circuit, resulting in lowered efficiency of the power conversion apparatus. Further, constraints on demagnetization resistance of a magnet used in the motor for the compressor and a permissible current and a permissible temperature of a semiconductor used in the inverter circuit may narrow the operating range.

In order to address those problems, for the purpose of attaining high efficiency in driving the motor and expanding the operating range, there has been proposed a power conversion apparatus including a booster circuit configured to expand the range of an output voltage of an inverter circuit (see, for example, Patent Literature 1).

In the power conversion apparatus described in Patent Literature 1, the booster circuit including a reactor, a backflow prevention diode, and a switching device is arranged between a rectifier circuit and the inverter circuit. A DC voltage rectified by the rectifier circuit is boosted by the booster circuit.

In the booster circuit, energy is accumulated in the reactor during an ON period of the switching device, and the accumulated energy is released during an OFF period thereof to boost the DC voltage. The DC voltage from the booster circuit is controlled by a time period during which the switching device is ON (on-duty). Through control of the on-duty of the switching device of the booster circuit, the voltage applied to the motor is increased to enable improved efficiency through reducing a motor current and expansion of the operating range of the motor.

PATENT LITERATURE

Patent Literature 1: Japanese Unexamined Patent Application Publication No. 2012-196142(Page 6, and FIG. 1 and FIG. 2)

In driving a high capacity class (for example, above 10 kW) compressor, when a DC voltage is boosted using the booster circuit described in Patent Literature 1, or when a boost is performed with a high boost rate being set (for example, 1.5 times or more), a reactor requires a large amount of energy. In that case, there are problems such as increase in cost and increase in size accompanying heat generation by the reactor.

Further, a semiconductor loss of the booster circuit increases, and thus, there are problems such as increase in cost accompanying increase in performance of a cooling component, and increase in size of a power module.

Further, in an air-conditioning apparatus, in order to improve year-round energy consumption efficiency (APF), the booster circuit is operated only in a required region and is stopped in an unrequired region. Thus, for the purpose of suppressing generation of a harmonic current when the booster circuit is stopped, it is required to secure an L value of the reactor to some extent, which results in a problem of increase in size of the reactor.

SUMMARY

The present invention has been made in order to solve the problems described above, and a first object of the present invention is to obtain a power conversion apparatus that can, even when a booster circuit is used in driving a high capacity class compressor, realize reduction in cost and reduction in size of the reactor while generation of the harmonic current is suppressed, and an air-conditioning apparatus including the power conversion apparatus.

A second object of the present invention is to obtain a power conversion apparatus that can realize reduction in cost and reduction in size of the power module, and an air-conditioning apparatus including the power conversion apparatus.

According to one embodiment of the present invention, there is provided a power conversion apparatus, including: a rectifier circuit configured to rectify an AC voltage from an AC power source; a booster circuit configured to boost an input voltage rectified by the rectifier circuit; a smoothing capacitor configured to smooth an output of the booster circuit; an inverter control unit configured to generate a PWM signal; an inverter circuit configured to convert a DC voltage smoothed by the smoothing capacitor into an AC voltage based on an input of the PWM signal and to supply the AC voltage to a motor; a boost mode switching unit having at least three boost modes in which a boost level of the input voltage is selected and configured to switch among the at least three boost modes depending on an operation status of the motor determined for the purpose of controlling a refrigeration cycle; and a boost control unit configured to control the booster circuit based on the switching by the boost mode switching unit.

According to one embodiment of the present invention, boosting of the booster circuit is selected among at least three boost modes depending on the operation status of the motor. This enables realization of reduction in cost and reduction in size of a reactor, a plurality of switching devices, and other components included in the booster circuit. Further, a boost ratio can be increased, which enables further expansion of an operating range of the motor.

DETAILED DESCRIPTION

Referring to the accompanying drawings, a power conversion apparatus and an air-conditioning apparatus including the power conversion apparatus according to an embodiment of the present invention are described below.

Figure 1:
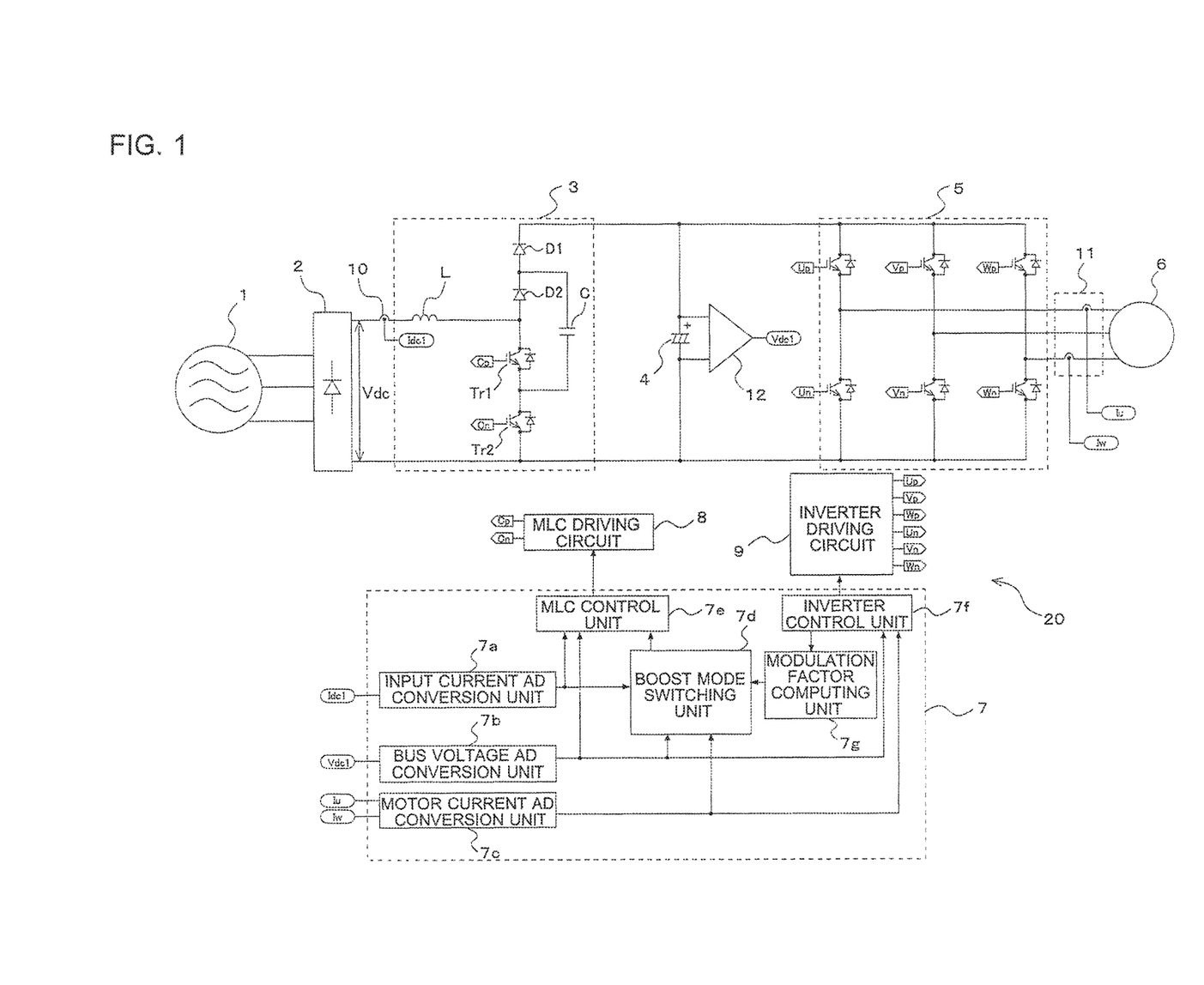
FIG. 1 is a schematic block diagram of a power conversion apparatus according to an embodiment of the present invention.
Figure 2:
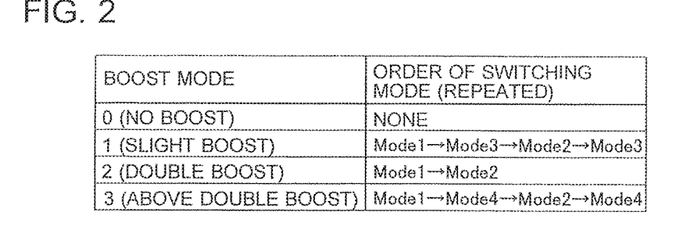
FIG. 2 is a table for showing combinations of boost modes and switching modes set for the respective boost modes.
Figure 3:
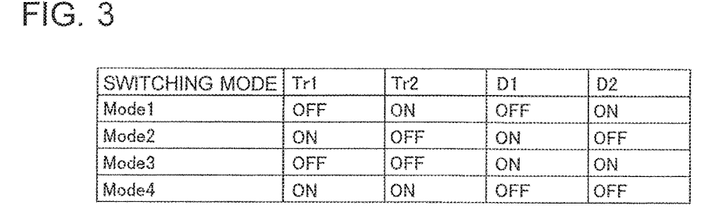
FIG. 3 is a table for showing switching modes of driving first and second switching devices of a multilevel chopper (MLC) circuit in FIG. 1.

FIG. 1 is a schematic block diagram of a power conversion apparatus according to the embodiment of the present invention. FIG. 2 is a table for showing combinations of boost modes and switching modes set for the respective boost modes. FIG. 3 is a table for showing switching modes of driving first and second switching devices of a multilevel chopper circuit in FIG. 1.

With reference to FIG. 1, a power conversion apparatus 20 includes a three-phase rectifier 2 connected to a commercial power source 1, a multilevel chopper circuit 3 (hereinafter referred to as "MLC circuit 3") serving as a booster circuit, a smoothing capacitor 4 connected between outputs of the MLC circuit 3, an inverter circuit 5 connected between electrodes of the smoothing capacitor 4, a control circuit 7, an MLC driving circuit 8, and an inverter driving circuit 9. A motor 6 of a compressor of an air-conditioning apparatus is connected to an output side of the inverter circuit 5. The compressor includes a compression mechanism unit configured to compress refrigerant on a refrigerant circuit through rotation of the motor 6.

The three-phase rectifier 2 is formed through bridge connection of six rectifier diodes, and is a three-phase full-wave rectifier configured to rectify an AC voltage of the commercial power source 1 (for example, AC 200 V or AC 400 V). The MLC circuit 3 includes a reactor L, a first switching device Tr1, and a second switching device Tr2 that are connected in series between outputs of the three-phase rectifier 2, a first diode D1 and a second diode D2 (backflow prevention diodes) connected in series between a node between the reactor L and the first switching device Tr1, and the smoothing capacitor 4, and a capacitor C connected in parallel with the second diode D2 and the first switching device Tr1. The MLC circuit 3 boosts a DC voltage rectified by the three-phase rectifier 2 based on a switching signal from the MLC driving circuit 8.

The first switching device Tr1, the second switching device Tr2, the first diode D1, and the second diode D2 are formed of, for example, a wide bandgap semiconductor such as silicon carbide (SiC), gallium nitride (GaN), and a diamond having a bandgap that is larger than that of a silicon (Si). Through formation of the first switching device Tr1, the second switching device Tr2, the first diode D1, and the second diode D2 of a wide bandgap semiconductor, loss can be reduced compared with the related art in which an Si-based switching device is used. As the first switching device Tr1 and the second switching device Tr2, semiconductor devices such as a MOSFET or an IGBT may be used instead of transistors. Further, as the first diode D1 and the second diode D2, devices such as a fast recovery diode may be used.

The smoothing capacitor 4 smooths and is charged with an output from the MLC circuit 3. The inverter circuit 5 includes switching devices (for example, IGBTs) that are connected as a three-phase bridge and diodes that are connected to the respective switching devices so as to be anti-parallel and configured to circulate a motor current. The inverter circuit 5 converts the DC voltage smoothed by the smoothing capacitor 4 (hereinafter referred to as "bus voltage Vdc1") into three-phase AC power based on a PWM signal from an inverter driving circuit 9, and supplies the AC power to the motor 6 (for example, DC brushless motor) of the compressor.

As the switching devices of the inverter circuit 5, a wide bandgap semiconductor such as a silicon carbide (SiC) device can be used instead of silicon (Si), similarly to the case of the first switching device Tr1 and the second switching device Tr2 described above.

An input current detecting unit 10 configured to detect an input current Idc1 that is input to the reactor L is arranged on an input side of the reactor L. A motor current detecting unit 11 configured to detect motor currents Iu and Iw from the inverter circuit 5 is arranged. Further, a bus voltage detecting unit 12 configured to detect the bus voltage Vdc1 generated between the electrodes of the smoothing capacitor 4 when the smoothing capacitor 4 is charged is arranged.

The control circuit 7 includes an input current AD conversion unit 7a configured to convert the input current Idc1 detected by the input current detecting unit 10 into a digital value, a bus voltage AD conversion unit 7b configured to convert the bus voltage Vdc1 from a differential amplifier 12 into a digital value, a motor current AD conversion unit 7c configured to convert the motor currents Iu and Iw detected by the motor current detecting unit 11 into digital values, a boost mode switching unit 7d, an MLC control unit 7e, an inverter control unit 7f, a modulation factor computing unit 7g, and other components. Depending on an operation status of the motor 6 of the compressor, the boost mode switching unit 7d selects a boost mode to change a boost level of an input voltage Vdc. As boost modes, there are, for example, Boost Mode 0 in which the input voltage Vdc is not boosted, Boost Mode 1 in which the input voltage Vdc is slightly boosted (for example, by about 20 V) to become the bus voltage Vdc1, Boost Mode 2 in which the input voltage Vdc is boosted twice its original value to become the bus voltage Vdc1, and Boost Mode 3 in which the input voltage Vdc is boosted more than twice its original value to become the bus voltage Vdc1. In Boost Mode 0, both the first switching device Tr1 and the second switching device Tr2 are in an OFF state, and the motor 6 of the compressor is controlled only by the inverter control unit 7f. A rotation speed of the motor 6 is determined for the purpose of controlling a refrigeration cycle in such a manner that, for example, an indoor temperature may become a target temperature.

The boost mode is switched using the following parameters indicating a load status of the compressor. The switching of the boost mode is to be described in detail when operation of the MLC control unit 7e and the MLC circuit 3 of the power conversion apparatus 20 is described.
 1. rotation speed of the motor 6
 2. input current Idc1
 3. modulation factor
 4. bus voltage Vdc1
 5. motor currents Iu and Iw (output currents of inverter circuit 5)
 6. pressure of refrigerant The MLC control unit 7e calculates a duty ratio of ON/OFF times of the first switching device Tr1 and the second switching device Tr2 based on the boost mode selected by the boost mode switching unit 7d, and inputs the result to the MLC driving circuit 8. As shown in FIG. 2, the MLC control unit 7e has data where the mode numbers with which the first switching device Tr1 and the second switching device Tr2 are driven are set with regard to the respective boost modes. Further, as shown in FIG. 3, the MLC control unit 7e has data in which a driving state of the first switching device Tr1 and a driving state of the second switching device Tr2 are set for each of the switching modes.

The switching modes include Mode 1 in which the first switching device Tr1 is OFF and the second switching device Tr2 is ON, Mode 2 in which the first switching device Tr1 is ON and the second switching device Tr2 is OFF, Mode 3 in which the first switching device Tr1 is OFF and the second switching device Tr2 is OFF, and Mode 4 in which the first switching device Tr1 is ON and the second switching device Tr2 is ON.

Next, the operation of the MLC control unit 7e and the MLC circuit 3 of the power conversion apparatus 20 is described with reference to FIG. 1 to FIG. 5.

Figure 4:
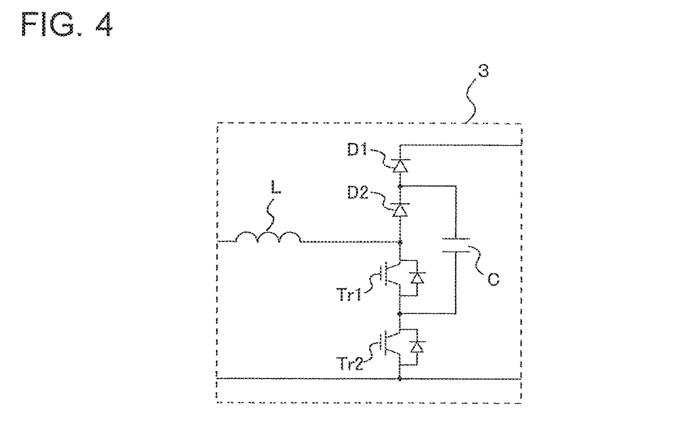
FIG. 4 is an enlarged view of the MLC circuit illustrated in FIG. 1.
Figure 5:
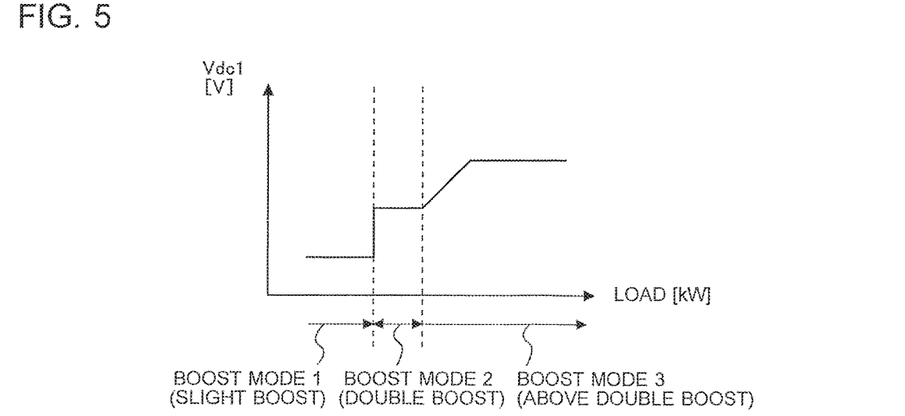
FIG. 5 is a graph for showing bus voltage levels of a bus voltage in respective boost modes in the MLC circuit.

FIG. 4 is an enlarged view of the MLC circuit illustrated in FIG. 1, and FIG. 5 is a graph for showing bus voltage levels of the bus voltage in the respective boost modes in the MLC circuit. In FIG. 5, there is shown change in the bus voltage Vdc1 when the boost mode is switched to Boost Modes 1, 2, and 3 in this order.

(1) When switching from Boost Mode 0 to Boost Mode 1 is performed by the boost mode switching unit 7d, the MLC control unit 7e controls the MLC driving circuit 8 so that the first switching device Tr1 and the second switching device Tr2 are driven in the order of Mode 1→Mode 3→Mode 2→Mode 3 that are set in Boost Mode 1, and iterates this control.

First, the MLC control unit 7e turns off the first switching device Tr1 and turns on the second switching device Tr2 via the MLC driving circuit 8 (Mode 1). At this time, a path of the reactor L→the second diode D2→the capacitor C→the second switching device Tr2 is conducting, and the capacitor C is charged with the input voltage Vdc.

Then, the MLC control unit 7e turns off both the first switching device Tr1 and the second switching device Tr2 via the MLC driving circuit 8 (Mode 3). At this time, a path of the reactor L→the second diode D2→the first diode D→the smoothing capacitor 4, as well as a path of the capacitor C→the first diode D1→the smoothing capacitor 4 are conducting, and the smoothing capacitor 4 is charged with the input voltage Vdc and the charged voltage of the capacitor C.

Thereafter, the MLC control unit 7e turns on the first switching device Tr1 and turns off the second switching device Tr2 via the MLC driving circuit 8 (Mode 2). At this time, a path of the reactor L→the first switching device Tr1→the capacitor C→the first diode D1→the smoothing capacitor 4 is conducting for the input voltage Vdc, and the capacitor C is charged with the input voltage Vdc.

Then, the MLC control unit 7e turns off both the first switching device Tr1 and the second switching device Tr2 again via the MLC driving circuit 8 (Mode 3). At this time, a path of the reactor L→the second diode D2→the first diode D1→the smoothing capacitor 4, as well as a path of the capacitor C→the first diode D1→the smoothing capacitor 4 are conducting, and the smoothing capacitor 4 is charged with the input voltage Vdc and the charged voltage of the capacitor C.

Through repetition of this series operation, the smoothing capacitor 4 is charged with a DC voltage that is boosted from the input voltage Vdc by about 20 V (see FIG. 5), which is input to the inverter circuit 5 as the bus voltage Vdc1. In this Boost Mode 1 (slight boost), for the purpose of suppressing generation of a harmonic current, the input current Idc1 is controlled to be constant.

(2) When switching from Boost Mode 1 to Boost Mode 2 is performed by the boost mode switching unit 7d, the MLC control unit 7e controls the MLC driving circuit 8 so that the first switching device Tr1 and the second switching device Tr2 are driven in the order of Mode 1→Mode 2 that are set in Boost Mode 2, and iterates this control.

First, the MLC control unit 7e turns off the first switching device Tr1 and turns on the second switching device Tr2 via the MLC driving circuit 8 (Mode 1). At this time, a path of the reactor L→the second diode D2→the capacitor C→the second switching device Tr2 is conducting, and the capacitor C is charged with the input voltage Vdc.

Next, the MLC control unit 7e turns on the first switching device Tr1 and turns off the second switching device Tr2 via the MLC driving circuit 8 (Mode 2). At this time, a path of the reactor L→the first switching device Tr1→the capacitor C→the first diode D1→the smoothing capacitor 4 is conducting, and a DC voltage that is the charged voltage of the capacitor C plus the input voltage Vdc is applied to the smoothing capacitor 4.

Through repetition of this series operation, the smoothing capacitor 4 is charged with the DC voltage that is twice the input voltage Vdc (see FIG. 5), which is input to the inverter circuit 5 as the bus voltage Vdc1. In this Boost Mode 2 (double boost), the input current Idc1 is controlled to be constant with a current ripple being at the minimum.

(3) When switching from Boost Mode 2 to Boost Mode 3 is performed by the boost mode switching unit 7d, the MLC control unit 7e controls the MLC driving circuit 8 so that the first switching device Tr1 and the second switching device Tr2 are driven in the order of Mode 1→Mode 4→Mode 2→Mode 4 that are set in Boost Mode 3, and iterates this control.

First, the MLC control unit 7e turns off the first switching device Tr1 and turns on the second switching device Tr2 via the MLC driving circuit 8 (Mode 1). At this time, a path of the reactor L→the second diode D2→the capacitor C→the second switching device Tr2 is conducting, and the capacitor C is charged with the input voltage Vdc.

Then, the MLC control unit 7e turns on both the first switching device Tr1 and the second switching device Tr2 via the MLC driving circuit 8 (Mode 4). At this time, a path of the reactor L→the first switching device Tr1→the second switching device Tr2 is conducting, and energy is accumulated in the reactor L by the input voltage Vdc. Meanwhile, the smoothing capacitor 4 is gradually charged with, via the first diode D1, the DC voltage charged in the capacitor C (see FIG. 5).

Thereafter, the MLC control unit 7e turns on the first switching device Tr1 and turns off the second switching device Tr2 via the MLC driving circuit 8 (Mode 2). At this time, a path of the reactor L→the first switching device Tr1→the capacitor C→the first diode D1→the smoothing capacitor 4 is conducting, and the smoothing capacitor 4 is charged with the input voltage Vdc and the energy accumulated in the capacitor C.

Then, the MLC control unit 7e turns on both the first switching device Tr1 and the second switching device Tr2 again via the MLC driving circuit 8 (Mode 4). At this time, a path of the reactor L→the first switching device Tr1→the second switching device Tr2 is conducting, and energy is accumulated in the reactor L by the input voltage Vdc.

Through repetition of this series operation, the smoothing capacitor 4 is charged with a DC voltage that is more than twice as much as the input voltage Vdc (see FIG. 5), which is output to the inverter circuit 5 as the bus voltage Vdc1. This Boost Mode 2 (above double boost) is used in a region in which a voltage more than twice as much as the input voltage Vdc is required. When the voltage becomes more than twice as much as the input voltage Vdc, the input current Idc1 is controlled to be constant.

Next, operation of switching the boost mode in the boost mode switching unit 7d is described.

(1) Switching from Boost Mode 0 (no boost) to Boost Mode 1 (slight boost)

When the input current Idc1 converted into a digital value by the input current AD conversion unit 7a exceeds a threshold value A that is set in advance, the boost mode switching unit 7d switches from Boost Mode 0 to Boost Mode 1. The threshold value A is determined by simulation analysis with regard to a relationship between the input current Idc1 flowing through the reactor L and the amount of generated harmonic current taking into consideration system impedance and fluctuations of the AC voltage of the commercial power source 1. The threshold value A is a threshold value of the input current Idc1 at which the amount of generated harmonic current reaches a limit. Specifically, the MLC circuit 3 is stopped in order to suppress loss therein, and Boost Mode 0 in which the boosting operation is not carried out continues until a maximum permissible amount of the generated harmonic current is reached during the stop of the MLC circuit 3. This enables realization of reduction in size of the reactor L and the first switching device Tr1 and the second switching device Tr2 of the MLC circuit 3.

The accuracy of the limit of the amount of the generated harmonic current may be improved by calculating in advance correction factors in relation to the bus voltage Vdc1, correcting the threshold value A using a correction factor in relation to the bus voltage Vdc1 converted into a digital value by the bus voltage AD conversion unit 7b (threshold value A×correction factor), and performing switching from Boost Mode 0 to Boost Mode 1 when the input current Idc1 is larger than the corrected value. The value of the input current Idc1 used here is an average of the input currents Idc1 that are detected over a certain period of time, or a computed effective value.

Alternatively, correction factors may be calculated in advance in relation to harmonic components contained in the input current Idc1, the threshold value A may be corrected using a correction factor in relation to the input current Idc1 converted into a digital value by the input current AD conversion unit 7a (threshold value A×correction factor in relation to the harmonic component of the input current Idc1), and switching from Boost Mode 0 to Boost Mode 1 may be performed when the input current Idc1 is larger than the corrected value.

(2) Switching from Boost Mode 1 (slight boost) to Boost Mode 0 (no boost)

A condition for switching from Boost Mode 1 to Boost Mode 0 includes performing the switching with hysteresis at the threshold value A at which switching from Boost Mode 1 to Boost Mode 0 is performed. A negative hysteresis set value (fixed value) is set for the threshold value A so that the amount of generated harmonic current may not be increased in Boost Mode 0. Specifically, when the input current Idc1 becomes smaller than (the threshold value A−the hysteresis set value) (the input current Idc1< (the threshold value A−the hysteresis set value)), switching from Boost Mode 1 to Boost Mode 0 is performed.

Further, the switching from Boost Mode 1 to Boost Mode 0 may be performed when, in addition to the condition described above, an operating frequency f1 of the motor 6 (compressor) when switching from Boost Mode 0 to Boost Mode 1 is performed is higher than an operating frequency f2 in Boost Mode 1.

Specifically, when the input current Idc1<the threshold value A-the hysteresis set value and the operating frequency f2<the operating frequency f1, switching from Boost Mode 1 to Boost Mode 0 is performed. The operating frequency f1 is an operating frequency of the motor 6 when switching from Boost Mode 0 to Boost Mode 1 is performed, and is, for example, recorded in the boost mode switching unit 7d by the inverter control unit 7f. Change in the operating frequency is slower than change in the input current, and thus, through addition of the operating frequency as a condition for the switching, hunting of boost mode switching operation due to fluctuations of the input current Idc1 can be prevented.

(3) Switching from Boost Mode 1 (slight boost) to Boost Mode 2 (double boost)

When the modulation factor of the PWM signal calculated by the modulation factor computing unit 7g exceeds a threshold value B that is set in advance, the boost mode switching unit 7d switches from Boost Mode 1 to Boost Mode 2. The threshold value B is a modulation factor of the PWM signal at which the output voltage of the inverter circuit 5 that can be output in Boost Mode 1 reaches a limit. When the rotation speed of the motor 6 increases in Boost Mode 1, the output voltage of the inverter circuit 5 also increases. When the output voltage exceeds a limit (modulation factor>1), the output voltage of the inverter circuit 5 is saturated, and thus, the current flowing through the motor 6 increases and loss of the power conversion apparatus 20 increases. When the current flowing through the motor 6 increases to a constraint level of the permissible current, the speed of rotation cannot be increased further. In order to avoid such a phenomenon, switching to Boost Mode 2 is performed when the modulation factor exceeds the threshold value B.

When the power conversion apparatus is pushed to a limit in terms of the APF performance, a condition of a rotation speed range of the motor 6 of the compressor and a pressure condition of the refrigerant (high pressure/low pressure) that are required for the APF performance are determined in advance. Therefore, a rotation speed threshold value C may be added as an AND condition to the above condition (modulation factor>threshold value B), or a refrigerant pressure condition threshold value F may be added as an AND condition to the above condition (modulation factor>threshold value B).

Specifically, when the modulation factor of the PWM signal in Boost Mode 1 is larger than the threshold value B (modulation factor>threshold value B), and the rotation speed of the motor 6 is higher than the threshold value C (rotation speed>threshold value C), switching from Boost Mode 1 to Boost Mode 2 is performed.

Alternatively, when the modulation factor of the PWM signal in Boost Mode 1 is larger than the threshold value B (modulation factor>threshold value B), and the refrigerant pressure (for example, high pressure) is higher than the threshold value F (refrigerant pressure>threshold value F), switching from Boost Mode 1 to Boost Mode 2 is performed.

Further, instead of this, total loss of the power conversion apparatus 20 in Boost Mode 2 and Boost Mode 1 when the motor 6 is operated to a constraint condition of the permissible current may be calculated in advance, and a threshold value D of the output currents of the inverter circuit 5 (motor currents Iu Iu and Iw) may be added as an AND condition. Specifically, when the modulation factor of the PWM signal in Boost Mode 1 is larger than the threshold value B (modulation factor>threshold value B) and the output current of the inverter circuit 5 is larger than the threshold value D (output current>threshold value D), switching from Boost Mode 1 to Boost Mode 2 is performed.

In this case, operation can be carried out so that the total loss including fluctuations of the input voltage Vdc and the like may be advantageous.

However, in order to secure control stability against fluctuations of the input voltage Vdc and fluctuations of the load, it is preferable to add the rotation speed condition described above in which a cycle of the change is long.

Specifically, when the modulation factor of the PWM signal in Boost Mode 1 is larger than the threshold value B (modulation factor>threshold value B), the output current of the inverter circuit 5 is larger than the threshold value D (output current>threshold value D), and further, the rotation speed of the motor 6 is higher than the threshold value C (rotation speed>threshold value C), switching from Boost Mode 1 to Boost Mode 2 is performed.

(4) Switching from Boost Mode 2 (double boost) to Boost Mode 1 (slight boost)

In switching from Boost Mode 2 to Boost Mode 1, the modulation factor cannot be used in a condition. This is because the modulation factor changes to a small extent due to the boosting. Challenges in the switching to Boost Mode 1 are that a condition for switching to Boost Mode 2 is not satisfied again after the switching, thereby avoiding hunting operation and that the switching to Boost Mode 1 is performed without fail under an operation condition in which the APF performance is required.

Boost Mode 1 is an operation mode in which the voltage is slightly boosted. Even if the AC voltage of the commercial power source 1 fluctuates during the operation, the fluctuation has no effect. Thus, a case in which a constant voltage cannot be obtained due to the switching does not occur. Therefore, switching from Boost Mode 2 to Boost Mode 1 is performed under the following conditions.

A rotation speed n1 of the motor 6 when switching from Boost Mode 1 to Boost Mode 2 is performed is recorded, and, when a rotation speed n2 of the motor 6 in Boost Mode 2 falls short of the rotation speed n1, switching to Boost Mode 1 is performed (rotation speed n1>rotation speed n2).

However, a load condition of the air-conditioning apparatus may be changed during the operation. When the load condition becomes larger than a load condition when switching to Boost Mode 2 is performed, the modulation factor after the switching becomes larger, which may result in hunting.

Accordingly, a case in which a pressure condition of the refrigerant that is required for the APF performance is satisfied may be added as an AND condition. Specifically, when the rotation speed n2 of the motor 6 in Boost Mode 2 becomes lower than the rotation speed n1 (rotation speed n1>rotation speed n2) and the refrigerant pressure becomes lower than the threshold value F (refrigerant pressure<threshold value F), switching from Boost Mode 2 to Boost Mode 1 is performed.

(5) Switching from Boost Mode 2 (double boost) to Boost Mode 3 (above double boost) When the modulation factor of the PWM signal calculated by the modulation factor computing unit 7g exceeds a threshold value E that is set in advance, the boost mode switching unit 7d switches from Boost Mode 2 to Boost Mode 3. The threshold value E is a modulation factor of the PWM signal at which the output voltage of the inverter circuit 5 that can be output in Boost Mode 2 reaches a limit. When the rotation speed of the motor 6 increases in Boost Mode 2, the output voltage of the inverter circuit 5 also increases. When the output voltage exceeds a limit (modulation factor>1), the output voltage of the inverter circuit 5 is saturated, and thus, the current flowing through the motor 6 increases and loss of the power conversion apparatus 20 increases. When the current flowing through the motor 6 increases to a constraint level of the permissible current, the speed of rotation cannot be increased further. In order to avoid such a phenomenon, switching to Boost Mode 3 is performed when the modulation factor exceeds the threshold value E in Boost Mode 2.

In Boost Mode 3, in order to reduce loss of the power conversion apparatus 20 as much as possible, the air-conditioning apparatus is operated to the maximum possible boost level while changing the boost level in order to maintain the modulation factor of the PWM signal at a constant value.

(6) Switching from Boost Mode 3 (above double boost) to Boost Mode 2 (double boost)

With regard to switching to Boost Mode 2, a boost level V1 (voltage) when the MLC circuit 3 is driven in Boost Mode 2 is recorded, and, when a boost level V2 in Boost Mode 3 returns to the boost level V1, switching from Boost Mode 3 to Boost Mode 2 is performed.

As described above, according to the embodiment, the MLC circuit 3 is used as a booster circuit and the MLC circuit 3 is controlled by switching among the four boost modes depending on the load status of the compressor. Thus, reduction in cost and reduction in size of the power module including the reactor L and the first switching device Tr1 and the second switching device Tr2 can be realized. Further, the boost ratio can be increased to further expand the operating range of the motor 6 of the compressor. Still further, during operation in which the voltage is boosted twice as much as the input voltage Vdc, a ripple current of the reactor L can be reduced to reduce reactor loss and suppress an outflow of a ripple current to a power source system. Further, generation of a harmonic current when the boosting operation of the MLC circuit 3 is stopped can be suppressed.

The invention claimed is:
1. A power conversion apparatus, comprising:
a rectifier circuit configured to rectify an AC voltage from an AC power source;
a booster circuit configured to boost an input voltage rectified by the rectifier circuit;
a smoothing capacitor configured to smooth an output of the booster circuit;
an inverter control unit configured to generate a PWM signal;

an inverter circuit configured to convert a DC voltage smoothed by the smoothing capacitor into an AC voltage based on an input of the PWM signal and to supply the AC voltage to a motor;

a boost mode switching unit having at least three different boost modes in which a boost level of the input voltage is selected and configured to switch among the at least three different boost modes based on an input current from the rectifier circuit or a modulation factor of the PWM signal both of which change depending on an operation status of the motor determined for controlling a refrigeration cycle; and a boost control unit configured to control the booster circuit based on the switching by the boost mode switching unit, wherein the at least three different boost modes comprise a first boost mode in which a boost level is set lowest and higher than the input voltage, a second boost mode in which a boost level is set higher than the boost level in the first boost mode, and a third boost mode in which a boost level is set higher than the boost level in the second boost mode, and the boost mode switching unit is configured to switch to the first boost mode when the booster circuit does not carry out boosting and when the input current from the rectifier circuit exceeds a threshold value A that is set in advance.

2. The power conversion apparatus of claim 1, wherein the boost mode switching unit has a correction factor calculated in relation to the input voltage smoothed by the smoothing capacitor, and is configured to correct the threshold value A using the correction factor when the input current from the rectifier circuit and the threshold value A are compared with each other, and switch to the first boost mode when the input current exceeds the corrected threshold value A.

3. The power conversion apparatus of claim 1, wherein the boost mode switching unit has a correction factor calculated in relation to a harmonic component contained in the input current from the rectifier circuit, and is configured to correct the threshold value A using the correction factor when the input current from the rectifier circuit and the threshold value A are compared with each other, and switch to the first boost mode when the input current exceeds the corrected threshold value A.

4. The power conversion apparatus of claim 1, wherein the boost mode switching unit is configured to stop boosting operation of the booster circuit in the boost control unit when, in the first boost mode, the input current from the rectifier circuit becomes lower than the threshold value A by a fixed value.

5. The power conversion apparatus of claim 1, wherein the boost mode switching unit is configured to stop boosting operation of the booster circuit in the boost control unit when, in the first boost mode, the input current from the rectifier circuit becomes lower than the threshold value A by a fixed value, and an operating frequency of the motor that is recorded when the boosting operation of the booster circuit is stopped becomes higher than an operating frequency of the motor in the first boost mode.

6. The power conversion apparatus of claim 1, wherein the boost mode switching unit is configured to switch to the second boost mode when, in the first boost mode, the modulation factor of the PWM signal exceeds a threshold value B that is set in advance.

7. The power conversion apparatus of claim 1, wherein the boost mode switching unit is configured to switch to the second boost mode when, in the first boost mode, the modulation factor of the PWM signal exceeds a threshold value B that is set in advance, and a rotation speed of the motor in the first boost mode is higher than a threshold value C that is set in advance.

8. The power conversion apparatus of claim 1, wherein the boost mode switching unit is configured to switch to the second boost mode when, in the first boost mode, the modulation factor of the PWM signal exceeds a threshold value B that is set in advance, and an output current of the inverter circuit is larger than a threshold value D that is set in advance.

9. The power conversion apparatus of claim 1, wherein the boost mode switching unit is configured to switch to the second boost mode when, in the first boost mode, the modulation factor of the PWM signal exceeds a threshold value B that is set in advance, an output current of the inverter circuit is larger than a threshold value D that is set in advance, and a rotation speed of the motor in the first boost mode is higher than a threshold value C that is set in advance.

10. The power conversion apparatus of claim 1, wherein the booster circuit comprises a reactor, a first switching device, and a second switching device that are connected in series between outputs of the rectifier circuit, a first diode and a second diode connected in series between the smoothing capacitor and a node between the reactor and the first switching device, and a capacitor connected in parallel with the second diode and the first switching device, and wherein the first switching device, the second switching device, the first diode, and the second diode comprise a wide bandgap semiconductor.

11. An air-conditioning apparatus, comprising:

the power conversion apparatus of claim 1;

a motor connected to the inverter circuit of the power conversion apparatus; and a compressor having a compression mechanism unit configured to compress refrigerant on a refrigerant circuit through rotation of the motor.

12. The power conversion apparatus of claim 6, wherein the boost mode switching unit is configured to switch from the second boost mode to the first boost mode when a rotation speed of the motor in the second boost mode becomes lower than a rotation speed of the motor obtained when switching from the first boost mode to the second boost mode is performed.

13. The power conversion apparatus of claim 6, wherein the boost mode switching unit is configured to switch to the third boost mode when, in the second boost mode, the modulation factor of the PWM signal exceeds a threshold value E that is set in advance.

14. The air-conditioning apparatus of claim 11, wherein the boost mode switching unit is configured to switch to the second boost mode when, in the first boost mode, the modulation factor of the PWM signal exceeds a threshold value B that is set in advance, and a refrigerant pressure of the compressor in the first boost mode is higher than a threshold value F that is set in advance.

15. The air-conditioning apparatus of claim 11, wherein the boost mode switching unit is configured to switch to the second boost mode when, in the first boost mode, the modulation factor of the PWM signal exceeds a threshold value B that is set in advance, a rotation speed of the motor in the first boost mode is higher than a threshold value C that is set in advance, and a refrigerant pressure of the compressor in the first boost mode is higher than a threshold value F that is set in advance.

16. The air-conditioning apparatus of claim 11, wherein the boost mode switching unit is configured to switch from the second boost mode to the first boost mode when a rotation speed of the motor in the second boost mode is lower than a rotation speed of the motor obtained when switching from the first boost mode to the second boost mode is performed, and a refrigerant pressure of the compressor in the first boost mode is lower than a threshold value F that is set in advance.

17. The power conversion apparatus of claim 13, wherein the boost mode switching unit is configured to switch to the second boost mode when a boost level in the third boost mode returns to a boost level obtained when the booster circuit is driven in the second boost mode.

* * * * *